United States Patent
Sasaki

(10) Patent No.: US 9,527,210 B2
(45) Date of Patent: Dec. 27, 2016

(54) ROBOT APPARATUS

(71) Applicant: CANON KABUSHIKI KAISHA, Tokyo (JP)

(72) Inventor: Masatoshi Sasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/521,158

(22) Filed: Oct. 22, 2014

(65) Prior Publication Data

US 2015/0148954 A1 May 28, 2015

(30) Foreign Application Priority Data

Nov. 26, 2013 (JP) ................................. 2013-244124

(51) Int. Cl.
*B25J 9/16* (2006.01)
*G05B 13/00* (2006.01)

(52) U.S. Cl.
CPC ................ *B25J 9/163* (2013.01); *G05B 13/00* (2013.01); *G05B 2219/40225* (2013.01); *Y10S 901/28* (2013.01); *Y10S 901/30* (2013.01); *Y10S 901/49* (2013.01)

(58) Field of Classification Search
CPC ........... B25J 9/163; B25J 9/1674; B25J 13/00; B25J 13/02; G05B 13/00; G05B 2219/40225; Y10S 901/28; Y10S 901/30; Y10S 901/49
See application file for complete search history.

(56) References Cited

U.S. PATENT DOCUMENTS

| | | | | | |
|---|---|---|---|---|---|
| 4,523,135 | A | * | 6/1985 | Kogawa | B25J 19/06 318/565 |
| 4,803,640 | A | * | 2/1989 | Mitomi | G05B 19/425 318/568.13 |
| 7,047,107 | B2 | * | 5/2006 | Kimura | B25J 9/1664 318/560 |
| 7,391,178 | B2 | * | 6/2008 | Tanaka | B25J 9/1676 318/568.2 |
| 2015/0165620 | A1 | * | 6/2015 | Osaka | B25J 13/088 700/250 |

FOREIGN PATENT DOCUMENTS

JP          8-300280 A       11/1996

* cited by examiner

*Primary Examiner* — Nicholas Kiswanto
(74) *Attorney, Agent, or Firm* — Canon U.S.A., Inc. IP Division

(57) ABSTRACT

A robot apparatus includes a manipulator including a hand and an arm, a teaching apparatus that teaches operation of the manipulator, and a control apparatus that controls the manipulator that operates in a regular operation status or an erroneous manipulation avoiding status based on a control signal from the teaching apparatus. After determining whether a status of the manipulator is the regular operation status or the erroneous manipulation avoiding status, the control apparatus transmits a control signal for performing operation at a set regular speed to the manipulator in a case of the regular operation status, and the control apparatus transmits a control signal for performing operation at a speed lower than or equal to a safety speed that is set based on the regular speed to the manipulator in a case of the erroneous manipulation avoiding status.

6 Claims, 5 Drawing Sheets

ROBOT APPARATUS

BACKGROUND OF THE INVENTION

Field of the Invention

The present invention relates to an operation control system to be used when teaching a robot by using a teaching apparatus such as a teaching pendant.

Description of the Related Art

Up to now, in a case where an operator starts operation of a manipulator having a hand 4 and an arm 3 by using a teaching apparatus such as a teaching pendant, the operator himself/herself needs to determine manipulation in conformity to a direction in which the operator desires to operate the manipulator on the basis of a reference for the operation such as a coordinate system which has been set and a current position of the manipulator. A coordinate system serving as the reference for the operation can be set in the manipulator, but the number of coordinate systems that can be set is not one, and a plurality of coordinate systems may be set. Therefore, for example, as illustrated in FIGS. 5A and 5B, there may be a case in which the operator recognizes that a coordinate system is a left-hand oriented system (FIG. 5A), however, a coordinate system actually set in the manipulator is a right-hand oriented system (FIG. 5B). In such a case where the operator has recognized the coordinate system incorrectly, the manipulator may excessively move in a direction that is not intended by the operator, and the manipulator may interfere with or collide against a peripheral device or the like. Accordingly, the operator needs to check whether or not the manipulator is operated in an assumed direction. When checking this, in general, an operation speed of the manipulator is set at a safe speed at which the manipulator can be stopped before interfering with the peripheral device even if the manipulator moves in a direction that is not intended by the operator, and the operator slightly moves the manipulator in the assumed direction to carry out the checking. Furthermore, after the checking, the operation speed is set again at an operation speed desired by the operator.

As described above, since the operation speed of the manipulator needs to be changed each time the operation direction is checked, the operation by the operator is complicated, and there may be also a case that due to an operational error made by the operator, the manipulator is operated at a high operation speed that is not safe even when the operation direction is checked. In view of the above, as described in Japanese Patent Laid-Open No. 8-300280, the following control system is used for the operation. The operation speed of the manipulator is automatically and mandatorily determined at the safe operation speed during a certain period, which is set in advance, from the start of the operation, and after the period ends, the operation speed of the manipulator is automatically switched to the set desired operation speed.

However, according to Japanese Patent Laid-Open No. 8-300280, the operation is mandatorily carried out at the safe operation speed during the preset period from the start of operation. Accordingly, when the manipulation is interrupted for some reason while the operator performs the operation in a certain direction, the operation is again performed at the safe operation speed during the preset period from the restart of operation even in a case where the operator performs the operation in the same direction as the direction before the manipulation is interrupted. Accordingly, even when the operation is performed in the operation direction of the manipulator which has already been checked, the operation is again carried out at the safe speed during the preset period from the start of operation, which is a redundant process, and the teaching for the manipulator takes time accordingly.

SUMMARY OF THE INVENTION

In view of the above, the present invention provides a robot apparatus that has small redundancy in the teaching time for teaching the operation of the manipulator and can perform the teaching in a short period of time.

To address the above-described issue, according to an aspect of the present invention, a robot apparatus includes:

a manipulator including a hand and an arm;

a teaching apparatus configured to teach operation of the manipulator; and a control apparatus configured to control the manipulator that operates in a regular operation status or an erroneous manipulation avoiding status based on a control signal from the teaching apparatus, in which after determining whether a status of the manipulator is the regular operation status or the erroneous manipulation avoiding status, the control apparatus transmits a control signal for performing operation at a set regular speed to the manipulator in a case of the regular operation status, and the control apparatus transmits a control signal for performing operation at a speed lower than or equal to a safe speed that is set based on the regular speed to the manipulator in a case of the erroneous manipulation avoiding status.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the drawings.

First Exemplary Embodiment

Figure 1:
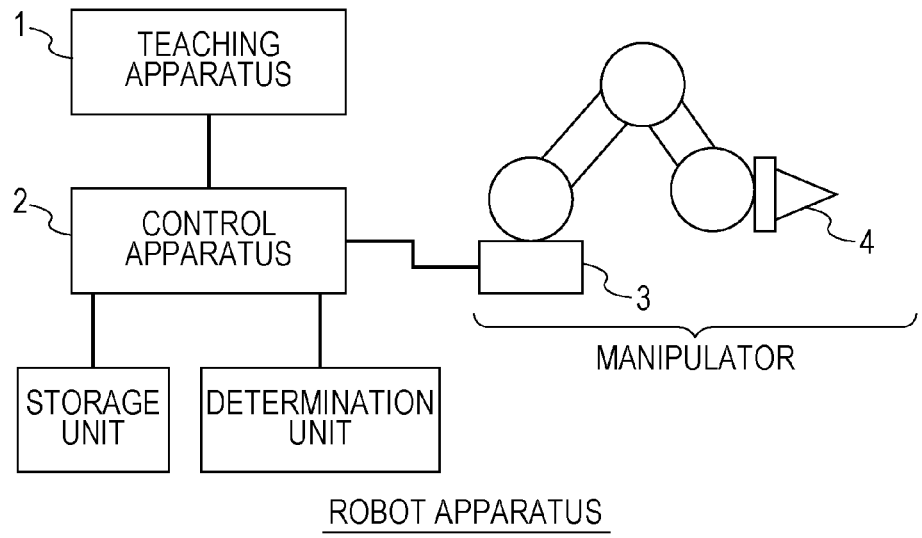
FIG. 1 is an overall block diagram of a system of a robot apparatus according to a first exemplary embodiment.

FIG. 1 is an overall block diagram of a system of a robot apparatus according to the present exemplary embodiment. With reference to FIG. 1, the robot apparatus is provided with a manipulator including an arm 3 and a hand 4. The arm 3 constitutes a multi-jointed arm (multi-axial arm) in which a plurality of links are coupled to each other, and the hand 4 is provided at a leading edge of the arm 3. The manipulator is connected to a control apparatus 2, and the control apparatus 2 is connected to a teaching apparatus 1 (teaching pendant) that can be manipulated by the operator.

Figure 2:
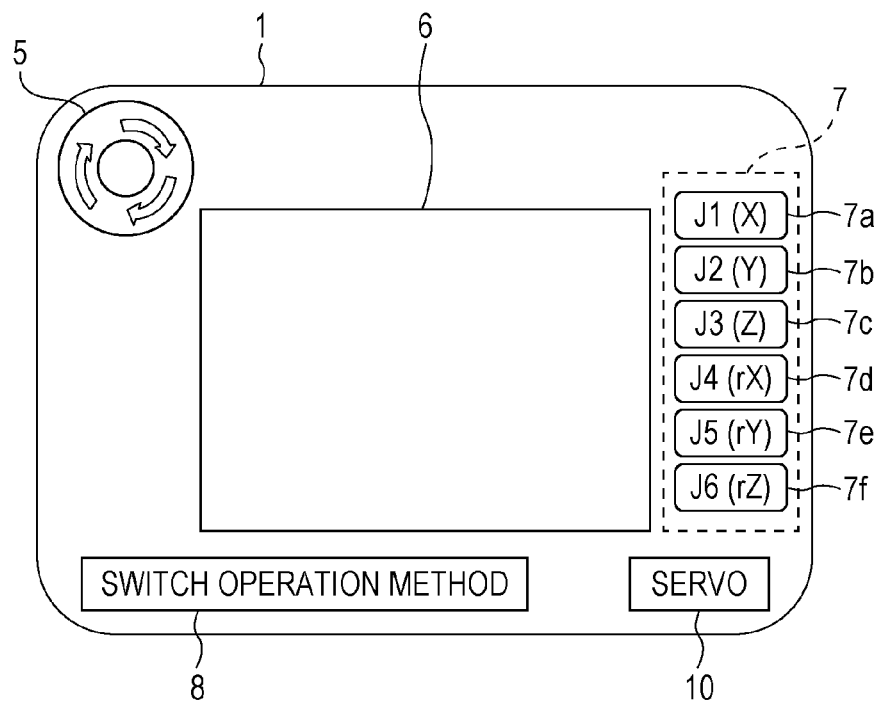
FIG. 2 is a diagram of a teaching apparatus according to the first exemplary embodiment.

FIG. 2 is a diagram illustrating a specific configuration of buttons, a display panel, and the like that are provided with the teaching apparatus 1. As illustrated in FIG. 2, the teaching apparatus 1 includes an emergency stop button 5 for the manipulator; a display panel 6 with which it is possible to check the status of the manipulator including settings such as a speed of the manipulator and an operation method thereof, positions of the respective axes, whether or not the operation direction has been already checked, and the like; buttons 7 for the respective axes of the operation directions of the manipulator; an operation method switching button 8 for switching operation of the manipulator, the operation direction of which is determined by specifying joint angles of the respective joint axes of the arm 3, between operation by using the absolute coordinate axis set in the manipulator as the reference and operation by using the coordinate axis arbitrarily set by the operator as the reference; and a servo button 10 for turning on/off a servo of the arm 3 in the manipulator. According to the present exemplary embodiment, the display panel 6 is a display panel, but may be a touch panel. The control apparatus 2 transmits a control signal to the manipulator in response to manipulation on the buttons 7 (7a to 7f) provided with the teaching apparatus 1 for the respective axes of the operation directions, thereby operating the arm 3.

Figure 3A:
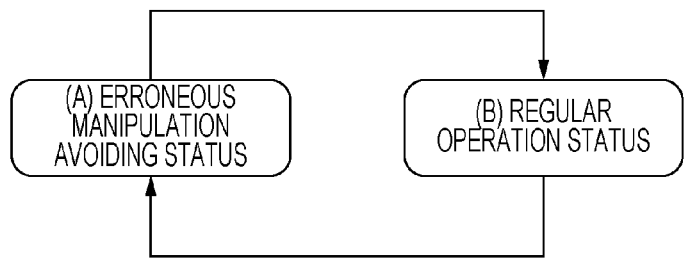
FIGS. 3A to 3C are status transition diagrams illustrating status transitions in operation of a manipulator.
Figure 3B:
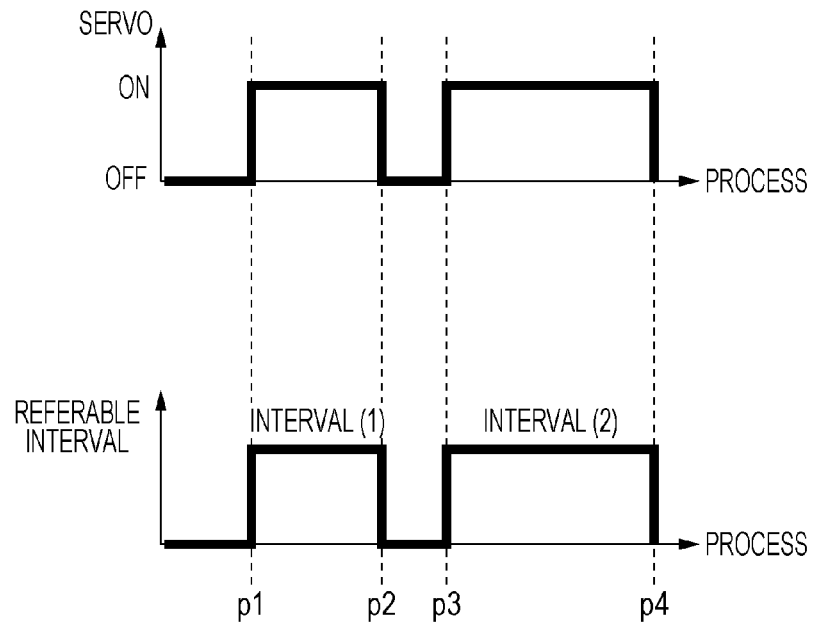
Figure 3C:
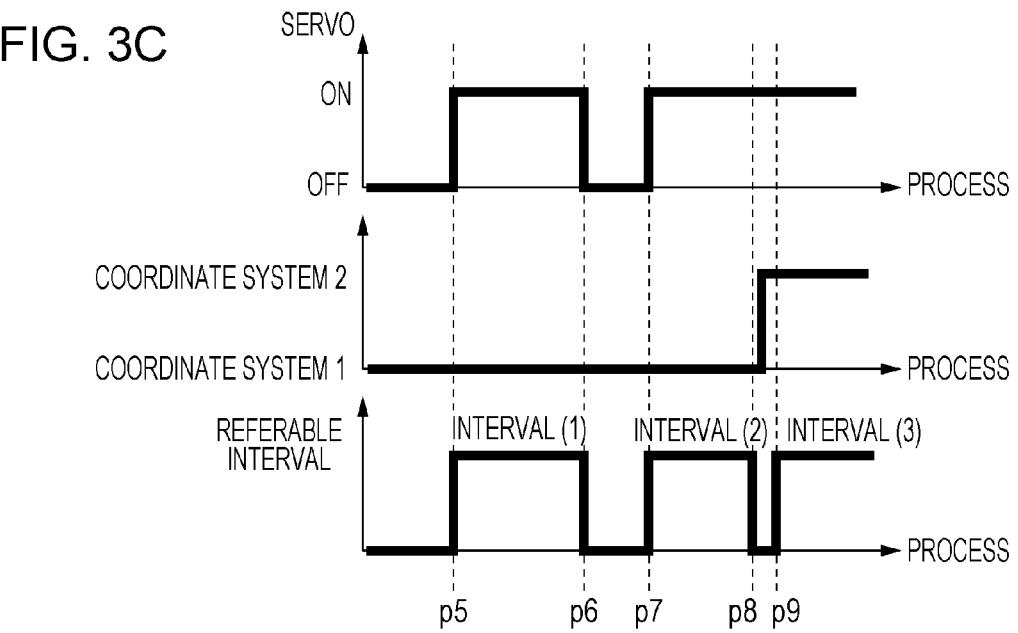

FIGS. 3A to 3C are status transition diagrams illustrating transitions between statuses related to operation at one axis in the operation of the arm 3 constituting the manipulator at the time of teaching operation. This status transition corresponds to one operation of the manipulator and is carried out for each of joint axes. For example, in a case where the manipulator is operated by specifying an absolute coordinate as a target by using the manipulator provided with a multi-jointed arm having six axes, the status transitions illustrated in FIGS. 3A to 3C exist in each of six axes in total including three axes of translational components X, Y, and Z and three axes of rotational components rX, rY, and rZ.

A status (A) is an erroneous manipulation avoiding status representing that the check operation corresponding to the operation has not been executed.

A status (B) is a regular operation status representing that the check operation corresponding to the operation has been executed.

A condition for the status transition from the status (A) to the status (B) is a condition based on an actual performance when the operation in the axial direction is performed for a preset time or longer or the operation in the axial direction is performed by a preset distance or farther (or at a preset angle or larger).

A condition for the status transition from the status (B) to the status (A) is a timing when the servo of the arm 3 constituting the manipulator is turned on or off or when the operation method switching button 8 of the teaching apparatus 1 is pressed.

On/off of the servo mentioned herein refers to a servo status of the arm 3 and includes turning off of the servo by pressing the emergency stop button 5, turning on/off of the servo by pressing the servo button 10 of the teaching apparatus 1, and the like.

Both the status transitions of the status (A) to the status (B) and the status (B) to the status (A) appropriately occur at a timing when the transition condition arises.

Figure 4:
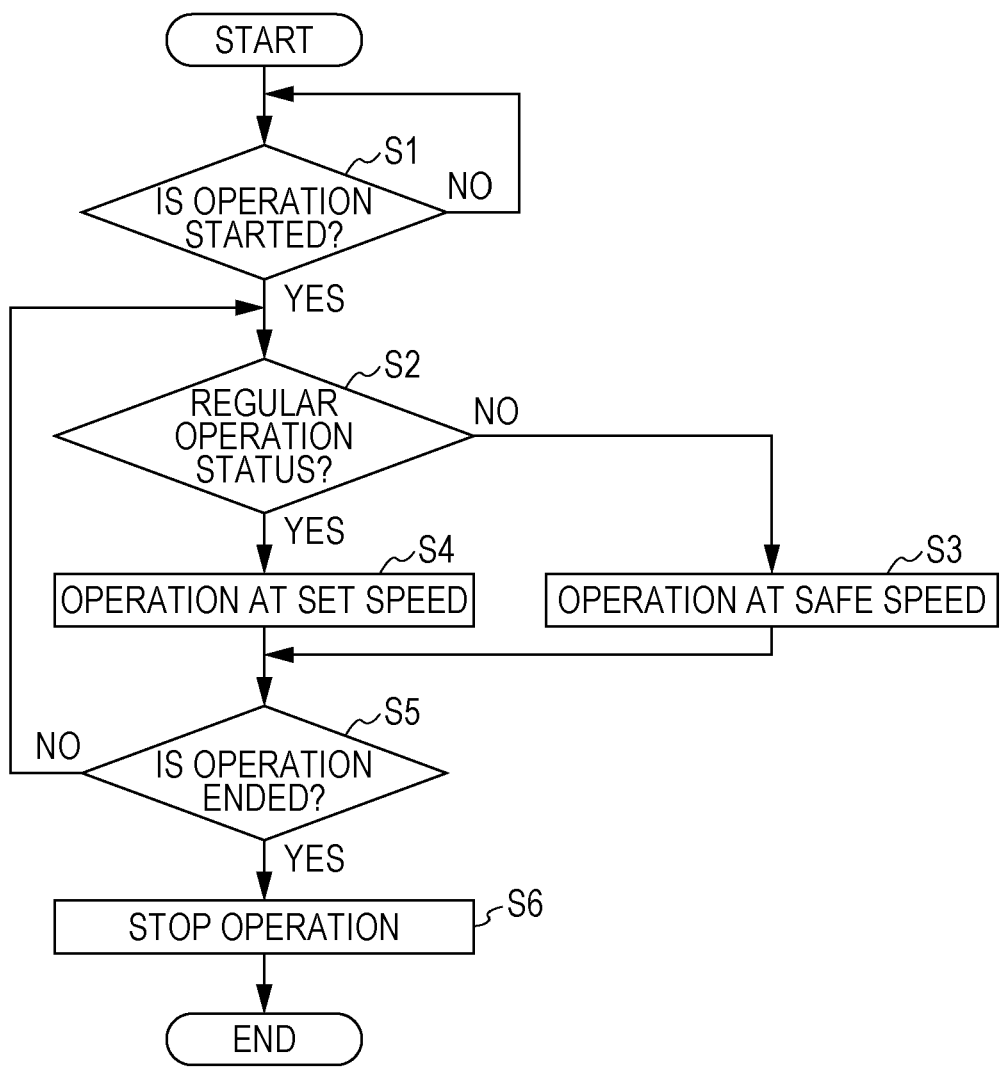
FIG. 4 is a flow chart for performing robot operation control.

FIG. 4 is a flow chart illustrating a process sequence of the control apparatus 2 when one of the buttons 7 (7a to 7f) in the teaching apparatus 1 is pressed upon teaching.

In S1, according to the present exemplary embodiment, the control apparatus 2 monitors pressing of one of the buttons 7 on the teaching apparatus 1 for the respective axes of the operation directions of the arm. In a case where one of the buttons is pressed, the processing shifts to S2. In a case where none of the buttons is pressed, the process of S1 is repeated to continue monitoring of the button pressing.

In S2, as described in the status transition diagrams of FIGS. 3A to 3C, whether or not the manipulator is in the regular operation status when the processing shifts to S2 is determined (in the case of NO, the operation status is the erroneous manipulation avoiding operation status). As a result of the determination, the processing shifts to S4 when the operation status is the regular operation status, and the processing shifts to S3 when the operation status is the erroneous manipulation avoiding operation status.

In S3, the arm 3 is operated at a preset safe speed at which the erroneous manipulation can be prevented, irrespective of a speed set by the operator. The safe speed will be described below.

In S4, the arm 3 is operated at the speed set by the operator.

In S5, the control apparatus 2 monitors the pressing status of the button 7 on the teaching apparatus 1 which has been pressed in S1 and corresponds to the axis of the operation direction of the arm.

In a case where the pressed button is released, the processing shifts to S6. In a case where the operator does not release the pressed button, the operation of the arm 3 continues, and the processing shifts to S2.

In S6, the current operation of the arm 3 is stopped.

The above-described safe speed (safety speed) may be a speed lower than or equal to a speed among speeds (regular speeds) set in the regular operation status. Alternatively, a speed lower than or equal to an average speed of the regular speeds set in the regular operation status may be set as the safety speed. Specifically, a speed lower than or equal to 25 mm/sec may be set as the safety speed. In this manner, the control apparatus 2 determines whether the manipulator is in the regular operation status or the erroneous manipulation avoiding status and operates the manipulator at the safety speed or lower in the case of the erroneous manipulation avoiding status.

Figure 5A:
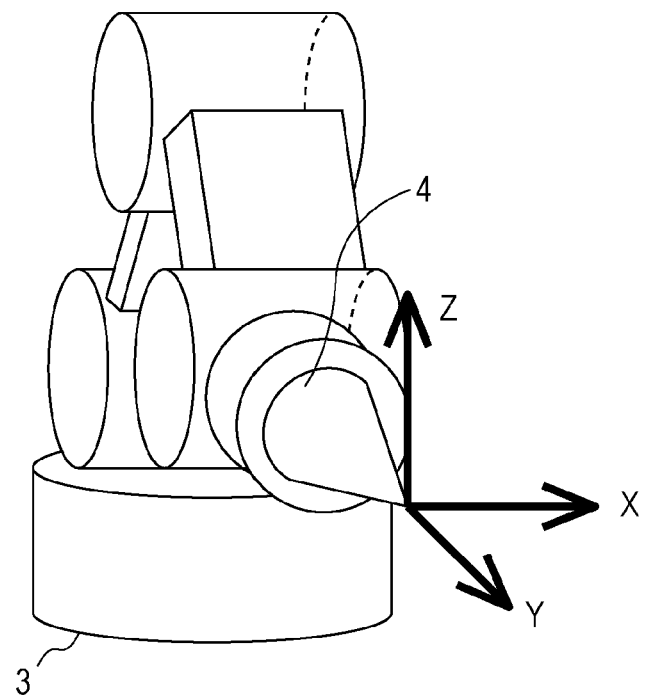
FIGS. 5A and 5B are schematic diagrams for describing an orientation of a coordinate system recognized by the operator and an orientation of the coordinate system actually set in the manipulator.
Figure 5B:
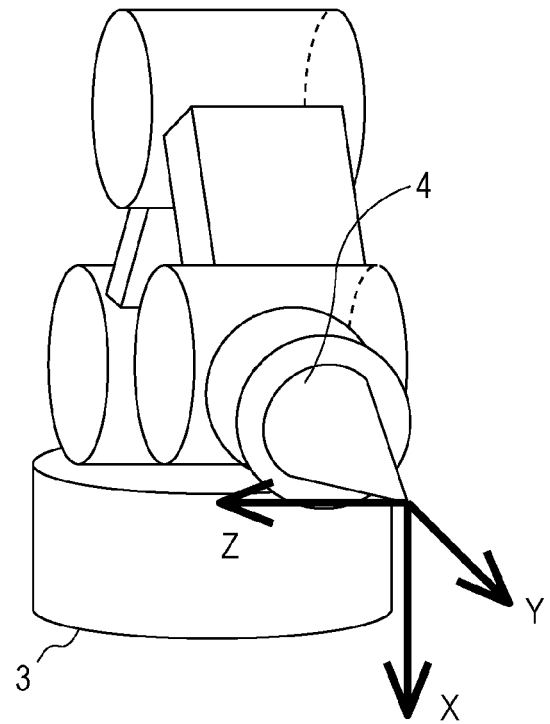

As described above, FIGS. 5A and 5B illustrate two types of coordinate systems set in the manipulator (coordinate systems in which the origin is set at the leading edge of the hand 4 and used as the reference for operating the arm 3).

As described above, in a case where the operator performs the manipulation, even if the orientation of the coordinate system (FIG. 5A) recognized by the operator is different from the actual orientation of the coordinate system (FIG. 5B), the manipulator is safely operated by executing the above-described method, and also the redundancy is small. Thus, the period of time for checking the operation direction is shortened as a result, and the teaching time can be shortened.

In addition, according to the present exemplary embodiment, in a case where the operator forgets to confirm the operation direction when the operation of checking the operation direction is performed in the erroneous manipulation avoiding operation status, and the operator desires to check the operation direction again, the condition for the transition from the regular operation status to the erroneous manipulation avoiding operation status is intentionally caused by turning off the servo of the arm 3 and then turning on the servo or by pressing a regular operation reset button, for example. Thus, the transition from the regular operation status to the erroneous manipulation avoiding operation status can be realized, and the operation direction can be checked again in a safe manner.

Furthermore, since the display panel displays whether or not the operation direction has been checked, the operability can be improved.

Second Exemplary Embodiment

Figure 6:
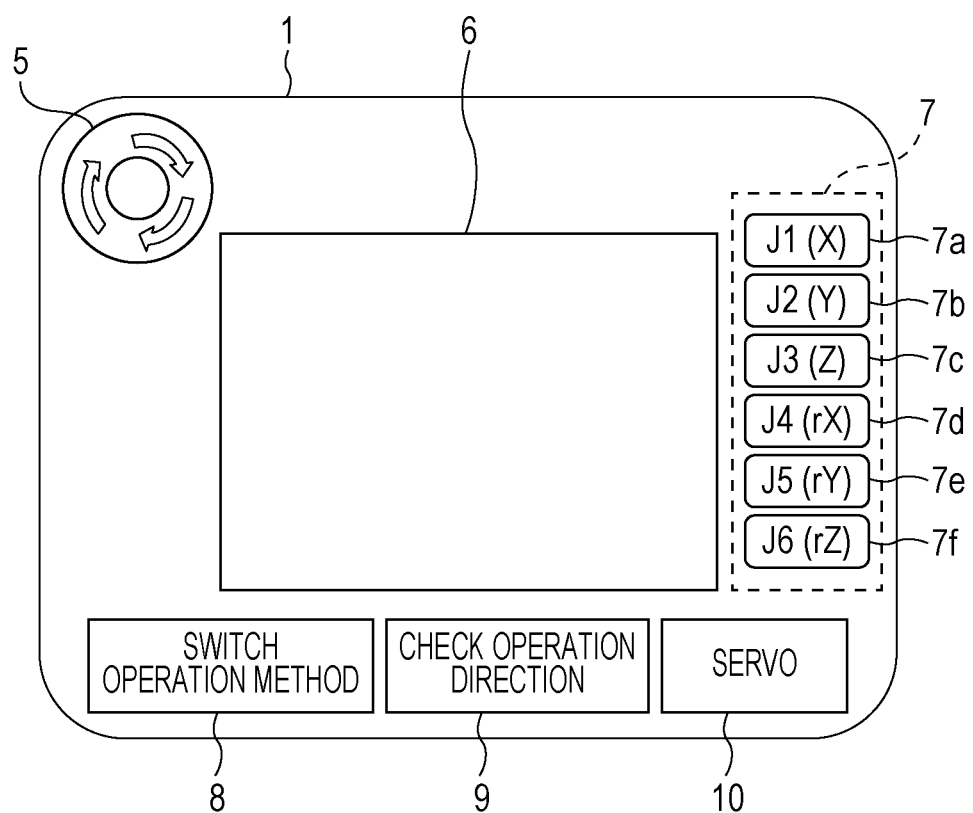
FIG. 6 is a schematic diagram of a teaching apparatus according to a second exemplary embodiment.

FIG. 6 is a schematic diagram illustrating configurations of buttons used in the present exemplary embodiment and the display panel provided with the teaching apparatus 1.

A difference from the first exemplary embodiment resides in an operation direction checking button 9 in the second exemplary embodiment. The operation direction checking button 9 is constituted by a toggle button and used in a case where the operator intentionally shifts the status to the status (B) when the axis manipulated by the operator is in the status (A), or inversely, in a case where the operator intentionally shifts the status to the status (A) when the axis manipulated by the operator is in the status (B).

Specifically, the status of the axis where the status transition is desired is checked on the display panel 6, and the button corresponding to the axis where the status transition is desired is selected from the buttons 7 for the respective axes of the operation directions while the operation direction checking button 9 is pressed.

According to the present exemplary embodiment, in the method for the status transition, the button of the axis where the status transition is desired is selected from the buttons 7 for the respective axes of the operation directions while the operation direction checking button 9 is pressed. However, upon the status transition from the status (A) to the status (B), the status transition of the objective axis from the status (A) to the status (B) may be performed by pressing the operation direction checking button 9 while the axis selected from the buttons 7 for the respective axes of the operation directions is operated, by pressing the operation direction checking button 9 after the axis selected from the buttons 7 for the respective axes of the operation directions is operated, or by preparing the same number of operation direction checking buttons 9 as the buttons for the respective axes of the operation directions and pressing the corresponding one of the buttons.

In addition, according to the present exemplary embodiment, the operation direction checking button 9 is constituted by the toggle button, but buttons may be respectively prepared for the status transition from the status (A) to the status (B) and the status transition from the status (B) to the status (A).

Moreover, in a case where the display panel 6 is constituted by a touch panel, the operation direction checking button 9 may be provided on the touch panel.

Advantages

Whether the manipulator is in the erroneous manipulation avoiding operation status or the regular operation status is determined and the speed is changed in accordance with the status. Therefore, the time to be used for the teaching can be shortened while the minimum safety is secured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244124, filed Nov. 26, 2013, which is hereby incorporated by reference herein in its entirety.

What is claimed is:

1. A robot apparatus comprising:
a manipulator including an arm and a hand;
a teaching apparatus provided with a touch panel or a button; and
a control apparatus configured to control the manipulator by transmitting, based on a manipulation performed on the touch panel or the button of the teaching apparatus, a control signal to the manipulator,
wherein, based on the manipulation performed on the touch panel or the button of the teaching apparatus, the control apparatus transmits, to the manipulator, a control signal for switching an operation speed of the manipulator from a regular speed, which is a speed in a regular operation status to a speed lower than or equal to a safety speed, which is a speed in an erroneous manipulation avoiding status,
wherein transition from the erroneous manipulation avoiding status to the regular operation status is performed based on an actual performance in which the manipulator is operated for a preset time or longer, is performed based on an actual performance in which the manipulator is operated by a preset distance or farther, or is performed by selecting a coordinate serving as a reference for an operation direction of the robot apparatus.

2. The robot apparatus according to claim 1, wherein the safety speed is a speed lower than or equal to a lowest speed among regular speeds set in the regular operation status.

3. The robot apparatus according to claim 1, wherein the safety speed is a speed lower than or equal to an average speed of regular speeds set in the regular operation status.

4. The robot apparatus according to claim 1, wherein transition between the erroneous manipulation avoiding status, in which a speed is lower than or equal to the safety speed, and the regular operation status, in which a speed is the regular speed, is performed by turning on/off a servo of the manipulator.

5. The robot apparatus according to claim 1, wherein transition between the regular operation status in the manipulator and the erroneous manipulation avoiding status in the manipulator is performed by pressing a switch for switching to the erroneous manipulation avoiding operation status or pressing the switch for switching to the regular operation status.

6. The robot apparatus according to claim 1, further comprising a display configured to display whether a status in the manipulator is the regular operation status or the erroneous manipulation avoiding operation status.

* * * * *